(12) United States Patent
Ziarnik et al.

(10) Patent No.: US 8,856,560 B2
(45) Date of Patent: Oct. 7, 2014

(54) SETTINGS BASED ON OUTPUT POWERED BY LOW POWER STATE POWER RAIL

(75) Inventors: Gregory P. Ziarnik, Houston, TX (US); Michael R. Durham, Tomball, TX (US); Stephen J. Higham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 13/459,481

(22) Filed: Apr. 30, 2012

(65) Prior Publication Data
US 2013/0290740 A1  Oct. 31, 2013

(51) Int. Cl.
*G06F 1/00* (2006.01)
*G06F 15/177* (2006.01)
*G06F 9/00* (2006.01)

(52) U.S. Cl.
USPC .................................. 713/300; 713/1; 713/2

(58) Field of Classification Search
USPC .......................... 713/300, 320, 324, 100, 1, 2
See application file for complete search history.

(56) References Cited

U.S. PATENT DOCUMENTS

| | | | |
|---|---|---|---|
| 6,253,319 B1 * | 6/2001 | Tran et al. | 713/1 |
| 7,630,841 B2 * | 12/2009 | Comisky et al. | 702/60 |
| 7,716,504 B2 | 5/2010 | Nijhawan et al. | |
| 8,032,741 B2 | 10/2011 | Smith | |
| 8,122,514 B2 | 2/2012 | Ellison et al. | |
| 2008/0148036 A1 * | 6/2008 | Westerinen et al. | 713/2 |
| 2008/0148387 A1 * | 6/2008 | Madina et al. | 726/16 |
| 2008/0238488 A1 * | 10/2008 | Comisky et al. | 327/20 |
| 2008/0270652 A1 * | 10/2008 | Jeansonne | 710/108 |
| 2010/0125723 A1 | 5/2010 | Cooper et al. | |
| 2010/0250973 A1 * | 9/2010 | Breen et al. | 713/300 |
| 2010/0306563 A1 * | 12/2010 | Chen et al. | 713/323 |
| 2011/0219260 A1 * | 9/2011 | Nobunaga et al. | 714/6.13 |
| 2011/0271131 A1 * | 11/2011 | Lefebvre et al. | 713/323 |
| 2012/0038339 A1 | 2/2012 | Zhu et al. | |
| 2012/0106021 A1 * | 5/2012 | Suchoff | 361/194 |
| 2012/0239919 A1 * | 9/2012 | Lo et al. | 713/2 |
| 2013/0016578 A1 * | 1/2013 | Wu et al. | 365/226 |
| 2013/0103961 A1 * | 4/2013 | Brooks et al. | 713/320 |

FOREIGN PATENT DOCUMENTS

EP  04297802 A2 *  6/1991  ............... G06F 1/26

OTHER PUBLICATIONS

Don Woligroski, Power Supply 101: A Reference of Specifications, Dec. 12, 2011, tomsharedware.com, p. 5-7.*
General Purpose Input/Output Rail-to-Rail Low Power Operational Amplifiers, TSV321-TSV358-TSV324, Rev 5, Feb. 2008, pp. 1-17, STMicroelectronics, Available at: <st.com/internet/com/TECHNICAL_RESOURCES/TECHNICAL_LITERATURE/DATASHEET/CD00063292.pdf>.

* cited by examiner

*Primary Examiner* — Thomas Lee
*Assistant Examiner* — Santosh Poudel
(74) *Attorney, Agent, or Firm* — Milin Patel

(57) ABSTRACT

Example embodiments disclosed herein relate to determining a setting at a component. An output to be powered by a low power state power rail can output a value. The component is to be powered by an auxiliary power rail and determines the setting based on the value at auxiliary power good.

18 Claims, 3 Drawing Sheets

SETTINGS BASED ON OUTPUT POWERED BY LOW POWER STATE POWER RAIL

BACKGROUND

Manufacturers of computing devices generally make various computing devices. These manufacturers can set hardware settings based on a hardware strap, for example, by using a pull-up and/or pull-down resistor on an input. Hardware straps can be based on a resistor soldered into place and/or headers that can be connected via one or more jumpers.

BRIEF DESCRIPTION OF THE DRAWINGS

The following detailed description references the drawings, wherein.

DETAILED DESCRIPTION

Figure 1:
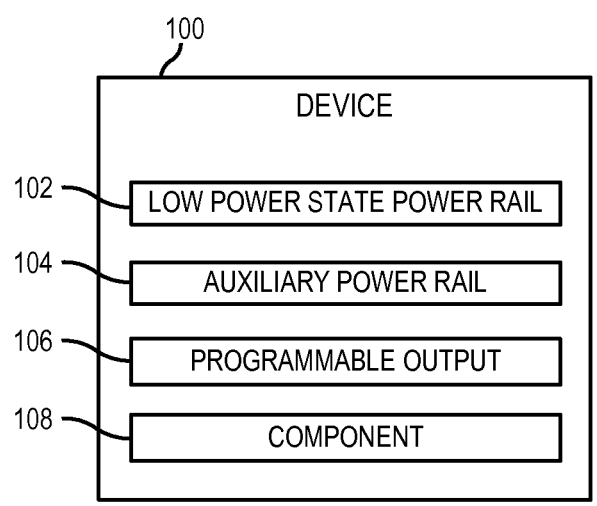
FIG. 1 is a block diagram of a device capable of changing a setting based on an output by resetting an auxiliary power rail, according to one example.

Many computing systems include hardware straps that allow the computing system to be customized during design time. Hardware straps can perform various functions, such as turning features on or off, write protecting firmware updatable components, or the like. In certain examples, a hardware strap is an electrical hardware that can be used to set the function. Further, example hardware straps can be implemented using a pull-up or pull-down resistor and/or a jumper. Some of these hardware straps are sampled by a component controlled by the hardware strap at reset while others are sampled during power good and/or auxiliary power good. For example, in the case of reset, the component samples whether to look at the hardware strap when hardware reset signal is received.

In the case of using a resistor, the setting of the hardware strap cannot be changed easily once the board is built. In the case of using a jumper, a user of the system would be required to manually populate and/or remove the jumper to change settings. A challenge with using jumpers is that the existence of the strap mechanism should be published so that users can use the jumpers. Further, the type of reset required in order to change the value of the component using the hardware strap needs to be understood by the user making the hardware change. As such, service personnel and/or end users would need to be educated to make the change. Moreover, a chassis of the computing system would need to be opened to change the jumper.

More particularly, many hardware straps are used for sampling for components making setting decisions at auxiliary (aux) power good. These components are generally not controlled by software because aux power good generally occurs when mechanical power is provided to a computing system.

Accordingly, various embodiments disclosed herein relate to allow software to control a hardware strap value dynamically for components sampling during auxiliary (aux) power good. In certain examples, aux power good means when the computing system is plugged in, but not in a low power state. The system need not be turned on. This would be the power rail that is turned on when the computing system is plugged in, unless the system is in a low power state. As such, when the system comes out of a low power state, components sampling on aux power good resample. In certain examples, power good means when a main power rail of the computing system is turned on. This would be the power rail that is turned on when the computing system turns on to boot. As such, in some examples, sampling at power good would mean to sample when the power button on the computing system is pushed.

Further, in some examples, a low power state power rail is a power rail that is powered when a computing system is plugged in and the computing system is in a low power state. The low power state power rail can also be active during other states where the computing system is plugged in. When in a low power state, the computing system consumes less than a threshold amount of power, for example, 0.50 watts or less. To consume such a low amount of power, many of the components on an aux power rail would be disconnected. The aux power rail can later be turned on when the computing system comes out of the low power state. As such, a general purpose input/output (GPIO) and/or another programmable output powered by the low power state rail can be used to dynamically control one or more straps that affect components on the aux power rail. Moreover, to resample, the computing system can change states to the low power state and back to the state where the aux power rail is powered. Further, the system can be configured dynamically in the field by a user without knowing how the transition occurs because the user can change the state in, for example, a firmware interface such as a Basic Input/Output System (BIOS) and the firmware interface can toggle the computing system to the low power state and back. Example features that can be implemented using such an approach include a write protect for firmware, an output voltage of a voltage regulator module, enabling a feature such as an input/output port or a trusted platform module, etc. To improve security, access to the firmware interface and/or access to the GPIO can be password protected.

According to certain examples, a power rail refers to a single voltage provided by a power supply unit. The voltage can be supplied to components of a computing device using one or more power plane or other connections. In some examples, a power rail is by a voltage regulator. In other examples, a power rail can be supplied by a power supply unit that converts main alternating current to the voltage. Further, in some examples, a computing device may have more than one power rail associated with a particular state, for example, a main power rails of a computing device may include a +12V power rail, a +5V power rail, a +3.3V power rail, power rails of other voltages, or the like.

FIG. 1 is a block diagram of a device capable of changing a setting based on an output by resetting an auxiliary power rail, according to one example. In this example, the device 100 includes a low power state power rail 102, an auxiliary power rail 104, a programmable output 106, and a component 108. As detailed herein, device 100 may be used to implement the methods of FIGS. 3 and 4. Device 100 may be a notebook computer, a slate computing device, workstation, a desktop computer, or any other computing device that can change a setting based on a programmable output powered by a low power state power rail 102. Further, the device 100 can include other power rails, for example, a main power rail that is activated when the device 100 powers on for use.

The low power state power rail 102 can be used to power on a limited amount of circuitry out of the device 100 while in a low power state. During the low power state, the low power state power rail 102 is powered, but other rails of the device 100 are not powered. In one example, Input/Output such as GPIO, a Super Input/Output (IO) controller, etc. can control one or more voltage regulators used to power one or more rails of the device 100, for example, the aux power rail 104, a main power rail, etc. In one example, a button, such as a power button, can be used to enable the device 100 to come out of the low power state. When the button is pressed, a signal can cause the voltage regulator controlling the main power rail, the aux power rail 104, and/or other power rails. As such, the power button can cause the device 100 to power on. In certain examples, other buttons (e.g., a wake button, a button on a peripheral device, etc.) can be used to turn on the device 100.

Moreover, in certain examples, the device 100 can support four or more states. The first state can be unplugged, when the device 100 is not plugged into a power source (e.g., a power outlet).

The second state can be a low power state, where the low power state power rail 102 is enabled, but other power rails are off. In certain examples, the low power state can have a power usage of less than 0.5 watts or less than or equal to 0.5 watts.

The third state can be an off state, where the aux power rail 104 is enabled. In the third state, the low power state power rail 102 can also be enabled. In the third state, the aux power rail 104 may include power for one or more features of the device 100, such as I/O such as a keyboard, a mouse, an Ethernet connection, etc. One or more of these features may be used to turn on the device 100 from the off state, for example, to boot via a remote connection.

The fourth state can be an on state, where a main power rail (not shown) is enabled. In the fourth state, the low power state power rail 102 and/or the aux power rail 104 can also be powered. The main power rail can be connected to the majority of the components of the device 100 can be used to power the system when the system is functional.

In some examples, the states can conform to Advanced Configuration and Power Interface (ACPI) power states. For example, the first state can conform to the G3 mechanical off state. The second state can conform to a soft off S5 state, where a power supply of the computing device supplies power to a power button to allow return to an S0/G0 working state. The third state can conform to a G1 sleep state and/or a soft off G2 state. Further, the S0/G0 working state can conform to the fourth state.

A programmable output 106 that can be configured to be powered by the low power state power rail 102. The configuration can occur as a part of hardware design of a circuit board or assembly of the device 100. Further, a component to be powered by a particular power rail can be set during assembly of the device 100. The programmable output 106 can be configured to output a value. In certain examples, the value can be used to control a signal that is connected to a component 108. The signal can be configured to use pull-up or pull-down resistors. The programmable output 106 can be set using one or more techniques. In one example, the programmable output 106 may be set by programming a chip or integrated circuit. In another example, the programmable output 106 may be set using firmware, such as BIOS. Because the programmable output 106 is powered by the low power state power rail 102, the programmable output 106 can retain its state when the device goes into the low power state. The programmable output 106 can output states based on how many bits or lines are controlled by the programmable output 106. For example, the a single bit may be associated with a 0 state or a 1 state, a two bit output may be associated with a 00 state, a 01 state, a 10 state, or a 11 state, etc. Further, states can be caused in other ways, for example, by using an analog output or three-state logic.

The component 108 can be configured to be powered by the aux power rail 104. Further, the component 108 can be configured to determine a setting at aux power good based on the value of the programmable output. In one example, the setting can be used for a write protect for the update of firmware. In certain examples, the write protection is a mechanism that prevents modification and/or erasure of the firmware. When the value is set to one state, the write protect can be enabled. This can add another layer of security for programming and/or reprogramming firmware. In another example, the component 108 can control whether an input/output expansion port should be enabled. For example, the setting can control whether a Peripheral Component Interconnect should be enabled or whether an internal graphics card should be enabled. Examples of input/output can include various devices, such as wireless devices, communications devices such as Ethernet ports, a Universal Serial Bus (USB), or the like. In yet another example, the component 108 can be a voltage regulator and the setting can include a representation of an output voltage provided by the voltage regulator. The voltage regulator can convert a voltage of the main power rail to an output voltage based on the setting. The output voltage can be used, for example, to power a memory, a processor, or another component, or the like. In the example of a processor, the processor may use a lower voltage than the main power rail supports. In certain examples, the voltage regulator can be powered via the aux power rail 104 and the output voltage can be used for other components.

To change the setting of the component, the programmable output 106 can be reprogrammed to output another value. The reprogramming can be implemented using firmware such as BIOS or another tool, such as management instrumentation. The aux power rail 104 is then reset while the low power state power rail 102 remains powered. This can occur by switching the system to the second "low power" state and then switching the system based on the third "off" state and/or the fourth "on" state described above. Transitioning through the states can change which power rails are powered. When the aux power rail 104 is activated, the component 108 determines the setting based on the then current state of the programmable output 106.

Figure 2:
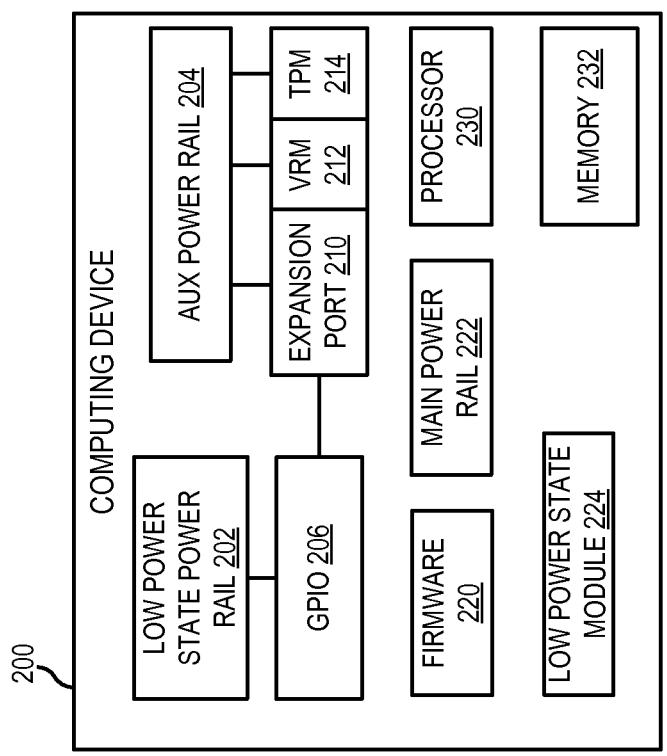
FIG. 2 is a block diagram of a computing device that determines a setting for a component configured to be powered by an auxiliary power rail at auxiliary power good based on an input configured to be powered by a low power state power rail, according to one example.

FIG. 2 is a block diagram of a computing device that determines a setting for a component configured to be powered by an auxiliary power rail at auxiliary power good based on an input configured to be powered by a low power state power rail, according to one example. In this example, the computing device 200 includes a low power state power rail 202, an aux power rail 204, a GPIO 206, and one or more components such as an expansion port 210, a voltage regulator module (VRM) 212, and a trusted platform module (TPM) 214. The computing device 200 can further include firmware 220, a main power rail 222, a low power state module 224, a processor 230, and/or memory 232.

As described in FIG. 1, a low power state power rail 202 can be used to power on a portion of the circuitry of the computing device 200 when the computing device 200 is in a low power state. Further, as with FIG. 1, an aux power rail 204 can be used to power one or more features of the computing device 200. The main power rail 222 can further power additional features and components of the computing device 200.

As with FIG. 1, the computing device 200 can support at least four activation states. The first state can be an unplugged state without power on the low power state power rail 202, the aux power rail 204, or the main power rail 222. In certain examples, a battery power rail (not shown) may be used in this state to power certain components (e.g., a memory associated with BIOS). The second state can be a low power state, where the low power state power rail 202 is active, but the aux power rail 204 and main power rail 222 are inactive. In certain examples, the low power state is configured so that power consumed on the low power state power rail 202 is below 0.5 watts. The third state can be an off state, where the low power state power rail 202 is active and the aux power rail 204 is active, but the main power rail 222 is inactive. The fourth state is when the main power rail 222 is active. In this state, the low power state power rail 202 and aux power rail 204 can also be active.

A GPIO 206 can be configured to be powered by the low power state power rail 202. In certain examples, GPIO 206 is one or more generic pins on a chip (e.g., an integrated circuit) whose behavior can be programmed or otherwise controlled via software. A GPIO 206 can be input or output. In this scenario, the GPIO 206 is an output. The GPIO 206 can output a value. In one example, the GPIO 206 can be represented by a pin. In other examples, the GPIO 206 can be represented by more than one pin.

A component, such as a controller controlling an expansion port 210, a VRM 212, a TPM 214, or the like configured to determine a setting based on the value of the GPIO 206. In one example, the value is sampled at auxiliary power good. In another example, the value is sampled at main power good. In auxiliary power good example, the component can be configured to be powered by the auxiliary power rail 204.

Firmware 220, such as BIOS or an Extensible Firmware Interface can be used to change the value of the GPIO 206. The change can occur when the main power rail 222 is enabled, for example, by going to the firmware interface during boot of the computing device 200 or via a management instrumentation. When the value is determined to be changed, the firmware can write to a chip controlling the GPIO 206 to change the value of the GPIO 206. The firmware interface or management instrumentation can output an interface to allow a user to make the change. The interface can password protect the change in value. Once a change is made, a controller can reprogram the GPIO 206 to change the value.

The low power state module 224 can remove power from the auxiliary power rail 204 and return power to the auxiliary power rail 204. This can occur while the low power state power rail 202 is powered. As such, the GPIO 206 retains its state and is powered when the aux power rail 204 is repowered. The low power state module 224 can also cause the computing device 200 to repower from the low power state to an auxiliary power state and/or to a main power state.

When the aux power rail 204 comes back online, the component can change its setting based on the changed value of the GPIO 206. This can occur because the component samples based on aux power good. With this approach, a user of the computing device 200 can quickly and easily change settings. Further, this allows the user to change settings such as controlling an expansion port 210, a VRM 212, a TPM 214, firmware write settings, or other modules that rely on sampling during aux power good to quickly and easily change the settings.

More specifically, in one example, the GPIO 206 controls settings for a write protect on the update of firmware, for example, firmware 220. In certain examples, the write protection is a mechanism that prevents modification and/or erasure of the firmware. As such, when the value is associated with a first state, the firmware cannot be updated. When the value is associated with a second state, the firmware can be updated. Further, the states may additionally be associated with an approach for the firmware modification. For example, the second state may allow updating via a management instrumentation while a third state may allow updating via a serial hardware connection. This allows for an extra layer of protection for the firmware because a user would need to first disable the write protection and then update the firmware. In certain examples, the firmware can be the firmware interface or BIOS of the computing device 200. In other examples, the firmware 220 can be a video BIOS, input/output firmware (e.g., Ethernet firmware), etc. Also, with this approach, a technician can perform field service to update the firmware 220 in a quick and efficient manner. The technician can have a password to change the GPIO 206 to change the setting that malware would not have access to. As such, the firmware 220 can be conveniently updated while maintaining a level of security.

In another example, the value of the GPIO 206 is used in the settings of a voltage regulator module 212. As such, the component is the VRM 212. The setting associated with the VRM 212 can be an output voltage provided by the VRM 212. As noted above, the VRM 212 can sample the GPIO 206 when at aux power good. The GPIO 206 in this case can include multiple pins to determine the value. As such, the VRM 212 can control the voltage setting. In some examples, when the main power rail 222 can provide a voltage to the VRM 212 that the VRM 212 can convert. For example, the VRM 212 can convert power from the main power rail 222 to an output voltage. The output voltage can be used for a particular chip or set of chips, such as one or more processors 230, memory 232, etc. In another example, the VRM 212 can be used to set voltage to the main power rail 222 and/or enable/disable the VRM 212. In certain examples, a circuit board of the computing device 200 may be used in different manners based on the use of the computing device. As such, the VRM 212 may be shut off using the GPIO 206.

In yet another example, the component can include an expansion port 210, such as an Input/Output expansion port like a graphics card or port, a Peripheral Component Interconnect express (PCIe) interface, an Ethernet card, etc. The setting of the expansion port 210 can represent whether the expansion port 210 should be enabled. In certain examples, the GPIO 206 can be used to choose between multiple expansion ports 210 to determine which one should be enabled.

In a further example, the component can be a TPM 214. The setting can represent whether the TPM 214 is enabled. In certain examples, this can be used by a manufacturer to dynamically set configurations of computing devices 200 based on locations the manufacturer ships to. For example, certain countries may require that TPMs 214 not be enabled in computing devices 200 bought or executed in the respective county while other countries may sponsor the use of TPMs 214. As such, the manufacturer can change the setting on computing devices 200 shipped to one country dynamically instead of populating a hardware component to distinguish computing devices 200 shipped to varying countries.

As with device 100 of FIG. 1, computing device 200 may be a notebook computer, a slate computing device, a portable reading device, a workstation, a server, a desktop computer, or any other computing device. Processor 230 may be a CPU, GPU, or microprocessor suitable for retrieval and execution of instructions and/or electronic circuits configured to perform the functionality one or more modules described herein, such as the low power state module 224. Further, one or more other components can be implemented using another processor or controller.

Processor 230 may be, at least one central processing unit (CPU), at least one semiconductor-based microprocessor, at least one graphics processing unit (GPU), other hardware devices suitable for retrieval and execution of instructions stored in a machine-readable storage medium, or combinations thereof. For example, the processor 230 may include multiple cores on a chip, include multiple cores across multiple chips, multiple cores across multiple devices (e.g., if the computing device 200 includes multiple node devices), or combinations thereof. Processor 230 may fetch, decode, and execute instructions. As an alternative or in addition to retrieving and executing instructions, processor 230 may include at least one integrated circuit (IC), other control logic, other electronic circuits, or combinations thereof that include a number of electronic components for performing the functionality of certain instructions.

In certain examples, the memory 232 can be implemented as a machine-readable storage medium. A Machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium may be encoded with a series of executable instructions for performing one or more tasks.

Figures 3, 4:
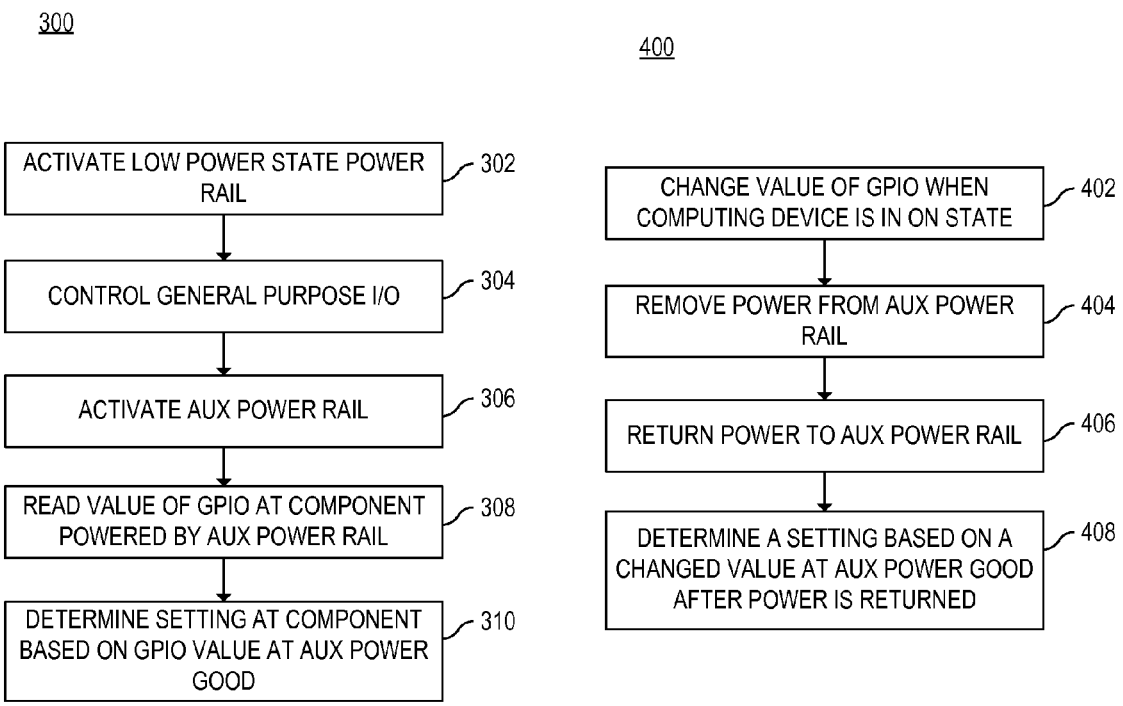
FIG. 3 is a flowchart of a method for determining a setting for a component at auxiliary power good, according to one example.
FIG. 4 is a flowchart of a method for determining a setting based on a changed value at auxiliary power good, according to one example.

FIG. 3 is a flowchart of a method for determining a setting for a component at auxiliary power good, according to one example. Although execution of method 300 is described below with reference to computing device 200, other suitable components for execution of method 300 can be utilized (e.g., device 100). Method 300 may be implemented in the form of executable instructions stored on a machine-readable storage medium, and/or in the form of electronic circuitry.

Method 300 may start at 302, where the computing device 200 can activate the low power state power rail 202. Other an aux power rail 204 and a main power rail 222 can be deactivated at this time. At 304, a GPIO 206 can be controlled. The GPIO 206 can be powered by the low power state power rail 202. As such, it can be active while other components of the computing device 200 are inactive.

At 306, the aux power rail 204 can be activated. A component (e.g., expansion port 210, VRM 212, TPM 214, etc.) that is powered by another power rail than the low power state power rail 202, such as the aux power rail 204, can read the value of the GPIO at 308. This can occur at the time when the power rail powering the component is activated. In the example of the aux power rail 204, the reading can occur at auxiliary power good. The component can determine a setting based on the value at auxiliary power good at 310.

As noted above, the component can perform various features. For example, in the case of the VRM 212, the VRM 212 can set an output voltage based on the sampling of the value of the GPIO 206. The setting can be a representation of the output voltage. Further, as noted above, the value can be sampled at aux power good. Examples of other components include TPMs, firmware write protect circuitry, circuitry for enabling an expansion port, etc.

FIG. 4 is a flowchart of a method for determining a setting based on a changed value at auxiliary power good, according to one example. Although execution of method 400 is described below with reference to computing device 200, other suitable components for execution of method 400 can be utilized (e.g., device 100). Method 400 may be implemented in the form of executable instructions stored on a machine-readable storage medium, and/or in the form of electronic circuitry.

Method 400 can begin at a state where the computing device 200 is at an on state and/or at a state where auxiliary power is enabled. A component can be set using a setting that is sampled at aux power good and uses a value of a GPIO 206. At 402, the GPIO 206 can change the value it outputs. In one example, the computing device 200 is in an on state, where a main power rail 222 provides power to the system. The main change in the GPIO 206 can be controlled via firmware 220, for example via a firmware menu (e.g., a BIOS menu), management instrumentation such Windows Management Instrumentation (WMI), or the like.

At 404, power is removed from the aux power rail 204. Then, at 406, power can be returned to the aux power rail 204. In one example, a shutdown of a running operating system can control the power removal. In another example, the power removal can be controlled by the execution of firmware. In certain examples, the firmware can set a timer to turn on the aux power rail 204 after a predetermined time. In some examples, the timer or another switching mechanism can be powered via the low power state power rail 202. With this approach, the firmware can cause the computing device 200 to go into a low power state and then return from the low power state to control the powering of the aux power rail 204.

At 408, the component can determine another setting based on the changed value of the GPIO 206. The sampling can occur at aux power good after the power is returned to the aux power rail 204.

With the above approaches, hardware straps that are normally controlled via hardware can be controlled via software. Because the GPIO is powered by the low power state power rail, hardware straps that are normally read at aux power good can be changed via software. This can allow for changes that may have required a board spin by the manufacturer to be accomplished by software. Further, firmware upgrades can be more easily accomplished while still remaining secure.

What is claimed is:

1. A computing device comprising:
   a low power state power rail;
   an auxiliary power rail;
   a general purpose input/output to be powered by the low power state power rail;
   a firmware to change the value of the general purpose input/output; and
   a component to be powered by the auxiliary power rail that determines a setting based on a value of the general purpose input/output at auxiliary power good, wherein the setting represents a write protect for modification of the firmware.

2. The computing device of claim 1, further comprising:
   a low power state module to remove power from the auxiliary power rail and to return power to the auxiliary power rail.

3. The computing device of claim 1, wherein the setting is changed based on the changed value of the general purpose input/output.

4. The computing device of claim 1, wherein the setting further represents a write protect for update of the firmware.

5. The computing device of claim 1, wherein the component comprises a voltage regulator module and wherein the setting comprises a representation of an output voltage provided by the voltage regulator module.

6. The computing device of claim 5, further comprising:
a main power rail, wherein the voltage regulator module converts a main power rail voltage from the main power rail to the output voltage.

7. The computing device of claim 1, wherein the component comprises an input/output expansion port, and wherein the setting represents whether the input/output expansion port should be enabled.

8. The computing device of claim 1, wherein power consumed on the low power state power rail is set below 0.5 watt.

9. The computing device of claim 1, wherein the component comprises a trusted platform module, and wherein the setting represents whether the trusted platform module is enabled.

10. A method comprising:
activating a low power state power rail of a computing device;
controlling a general purpose input/output of the computing device powered by the low power state power rail;
changing a value of the general purpose input/output when the computing device is in an on state based on firmware;
activating an auxiliary power rail;
reading the value of the general purpose input/output at a component powered by the auxiliary power rail of the computing device; and
determining a setting, at the component, based on the value at auxiliary power good wherein the setting represents a write protect for modification of the firmware.

11. The method of claim 10, further comprising:
removing power from the auxiliary power rail;
returning power to the auxiliary power rail; and
determining another setting, at the component, based on the changed value at auxiliary power good after the power is returned to the auxiliary power rail.

12. The method of claim 10, wherein the component comprises a voltage regulator module and wherein the setting comprises a representation of an output voltage provided by the voltage regulator module, and wherein the voltage regulator module converts a third power rail voltage to the output voltage.

13. A device comprising:
a low power state power rail;
an auxiliary power rail;
a programmable output to be powered by the low power state power rail that outputs a value;
a component to be powered by the auxiliary power rail that determines a setting at auxiliary power good based on the value,
wherein to change the setting, the programmable output is reprogrammed to output another value and the auxiliary power rail is reset while the low power state power rail remains powered, and wherein the setting represents a write protect for modification an of a firmware.

14. The device of claim 13, wherein the setting further represents a write protect for update of firmware.

15. The device of claim 13, further comprising:
a main power rail,
wherein the component is a voltage regulator module that converts a voltage of the main power rail to an output voltage based on the setting.

16. The computing device of claim 1, wherein the write protect modification includes erasure of the firmware.

17. The method of claim 10, wherein the write protect modification includes erasure of the firmware.

18. The device of claim 13, wherein the write protect modification includes erasure of the firmware.

* * * * *

UNITED STATES PATENT AND TRADEMARK OFFICE
CERTIFICATE OF CORRECTION

PATENT NO. : 8,856,560 B2  
APPLICATION NO. : 13/459481  
DATED : October 7, 2014  
INVENTOR(S) : Ziarnik et al.

Page 1 of 1

It is certified that error appears in the above-identified patent and that said Letters Patent is hereby corrected as shown below:

In the Claims,

In column 9, line 27, in Claim 10, delete "good" and insert -- good, --, therefor.

Signed and Sealed this  
Tenth Day of March, 2015

Michelle K. Lee  
*Deputy Director of the United States Patent and Trademark Office*